United States Patent
Luo et al.

(10) Patent No.: US 6,608,719 B1
(45) Date of Patent: Aug. 19, 2003

(54) COMB WAVELENGTH DIVISION MULTIPLEXER

(75) Inventors: Yong Luo, Hubei (CN); Luozhen Fang, Hubei (CN); Shuihua Liu, Hubei (CN); Kun Ma, Hubei (CN); Yanzhong Xu, Hubei (CN)

(73) Assignee: Wuhan Research Institute of Posts and Telecommunications, MII, Wuhan (CN)

( * ) Notice: Subject to any disclaimer, the term of this patent is extended or adjusted under 35 U.S.C. 154(b) by 0 days.

(21) Appl. No.: 09/697,020

(22) Filed: Oct. 26, 2000

(30) Foreign Application Priority Data

Mar. 24, 2000 (CN) .......................................... 0114440 A

(51) Int. Cl.⁷ .............................. G02B 5/30; H04J 14/02
(52) U.S. Cl. ........................ 359/487; 359/495; 359/497; 359/122; 359/124; 359/129; 385/11; 385/31; 385/36
(58) Field of Search ................................. 359/117, 122, 359/124, 129, 484, 487, 495, 497; 385/11, 31, 33, 36

(56) References Cited

U.S. PATENT DOCUMENTS

| | | | | |
|---|---|---|---|---|
| 5,471,340 A | * | 11/1995 | Cheng et al. ................ | 359/484 |
| 5,606,439 A | * | 2/1997 | Wu ................................ | 359/31 |
| 5,724,165 A | * | 3/1998 | Wu ................................ | 359/117 |
| 5,768,005 A | * | 6/1998 | Cheng et al. ................ | 359/495 |
| 5,808,763 A | | 9/1998 | Duck et al. ................... | 359/127 |
| 5,930,418 A | * | 7/1999 | Chang ........................... | 385/11 |
| 5,930,422 A | * | 7/1999 | Cheng ........................... | 385/11 |
| 6,005,697 A | | 12/1999 | Wu et al. ...................... | 359/117 |
| 6,097,869 A | * | 8/2000 | Chang et al. .................. | 385/11 |
| 6,212,313 B1 | * | 4/2001 | Li ................................. | 359/117 |

FOREIGN PATENT DOCUMENTS

| | | |
|---|---|---|
| CN | 1193124 | 9/1998 |
| EP | 0884615 | 6/1998 |
| WO | 9100535 | 7/1990 |

* cited by examiner

Primary Examiner—Ricky D. Shafer
(74) Attorney, Agent, or Firm—Ladas & Parry

(57) ABSTRACT

The invention discloses a comb wavelength division multiplexer, comprising: an input device at input side, a polarization splitter, a λ/2 phase delay wave plate; a birefringent crystal filter; and a reflective parallel light polarization splitter for reflecting an incident light beam from the birefringent crystal filter into the birefringent crystal filter again, and passing the reflected light beam through the λ/2 phase delay wave plate and the polarization splitter to an output side, so that the input side and the output side are a same side. The invention uses only one-stage filter to obtain a two-stage filtering effect. The channel isolation factor is improved and the size of the apparatus is reduced (FIG. 2).

1 Claim, 9 Drawing Sheets

COMB WAVELENGTH DIVISION MULTIPLEXER

FIELD OF THE INVENTION

The invention generally relates to optical communication systems) and more particularly, to a Comb Wavelength Division Multiplexer for optical communications.

BACKGROUND OF THE INVENTION

As optical telecommunication technology develops, information transmitted through optical fiber expands, and the full optical network grows, higher requirements are set for technologies like DWDM, optical passive devices. At present time, DWDM is implemented with grating, light waveguide, interference filter, birefringent filter and the like, but since density of channel are getting denser and denser, a better device is needed to multiplex or demultiplex signal. For example, DWDM may use the wavelength division device with birefringent crystal filter. Current design adopts one-stage filter to reduce the size of the device, but channel separation is poor. However, if two birefringent crystal filter element groups are applied to improve performance, the construction of two-stage filter is very complicated and the cost is expensive.

The invention overcomes above-mentioned problems with a new wavelength division device. A purpose of the invention is to obtain a two-stage filter effect with only one group of birefringent filters by light reflection The device has a reduced size and a better channel separation.

According to one aspect of the invention, a reflective parallel light polarization splitter 6 of the comb wavelength division multiplexer comprises a polarization splitter 6-1 and a right-angle prism 6-2, a slant side of the right-angle prism is parallel to a surface of the polarization splitter.

According to another aspect of the invention, a reflective parallel light polarization splitter 6 of the comb wavelength division multiplexer comprises a $\lambda/2$ phase delay wave plate 6-3, 6-4 disposed symmetrically in front of a polarization splitter 6-1, a $\lambda/4$ phase delay wave plate 6-5, and a flat mirror 6-2.

One feature of the above-mentioned comb wavelength division multiplexer is an I/O device comprising a three-core collimator and trapezoid prism, or comprising a three-collimator array.

Another feature of the above-mentioned comb wavelength division multiplexer is that a PMD compensator 3 be disposed between the polarization splitter 2 and the $\lambda/4$ phase delay wave plate device.

One advantage of the invention is duplicative use of a birefringent crystal filter element group by reflection to attain a dual-stage filtering effect, the channel isolation degree is greater than one-stage filter, the number of elements is lesser and package size is smaller. The second advantage is that the construction is independent on the polarization of input light. The third advantage is that the construction provides PMD compensation and eliminate PMD effect of device on the system. A device of wavelength division multiplexer of the invention can couple DWDM signals of odd channel and even channel into different fibers, so that the channel spacing is doubled and the signals are demultiplexed. The device can also couple signals of two channels into one fiber to realize multiplexing. If changing the birefringent filter in the device, we may also obtain devices like optical attenuator, optical modulator and optical 1×2 switcher with high isolation degree.

SUMMARY OF THE INVENTION

The invention provides a comb wavelength division multiplexer, comprising: an input device at input side; a polarization splitter; a $\lambda/2$ phase delay wave plate; a birefringent crystal filter; and a reflective parallel light polarization splitter for reflecting an incident light beam from the birefringent crystal filter into the birefringent crystal filter again, and passing the reflected light beam through the $\lambda/2$ phase delay wave plate and the polarization splitter to an output side, so that the input side and the output side are a same side;

The invention still provides a comb wavelength division multiplexer, comprising: an input device at input side, a polarization splitter; a $\lambda/2$ phase delay wave plate; a birefringent crystal filter; a mirror; a $\lambda/4$ phase delay wave plate; a polarization splitter; and two $\lambda/2$ phase delay wave plates, said two $\lambda/2$ phase delay wave plates are disposed respectively in an reflective optical path in front of the polarization splitter: said $\lambda/4$ phase delay wave plate is disposed between the polarization splitter and the mirror.

BRIEF DESCRIPTION OF THE DRAWINGS

The invention will be explained in further detail with reference to the accompanying drawings, in which.

In these FIGURES, reference number 1 represents I/O section, 1-1 is three-core collimator, 1-2 is trapezoid prism, 1-3 is three-core collimator array reference number 2 represents polarization splitter, 3 represents PMD compensation element, 4 is $\lambda/2$ phase delay element, 5 is the birefringent crystal filtering element group, 6 is the reflective parallel light polarization splitter, 6-1 is polarization splitter, 6-2 is comer cube prism, 6-3 and 6-4 are $\lambda/2$ phase delay elements, 6-5 represents $\lambda/4$ phase delay element, 6-7 represents flat mirror.

Figure 2:
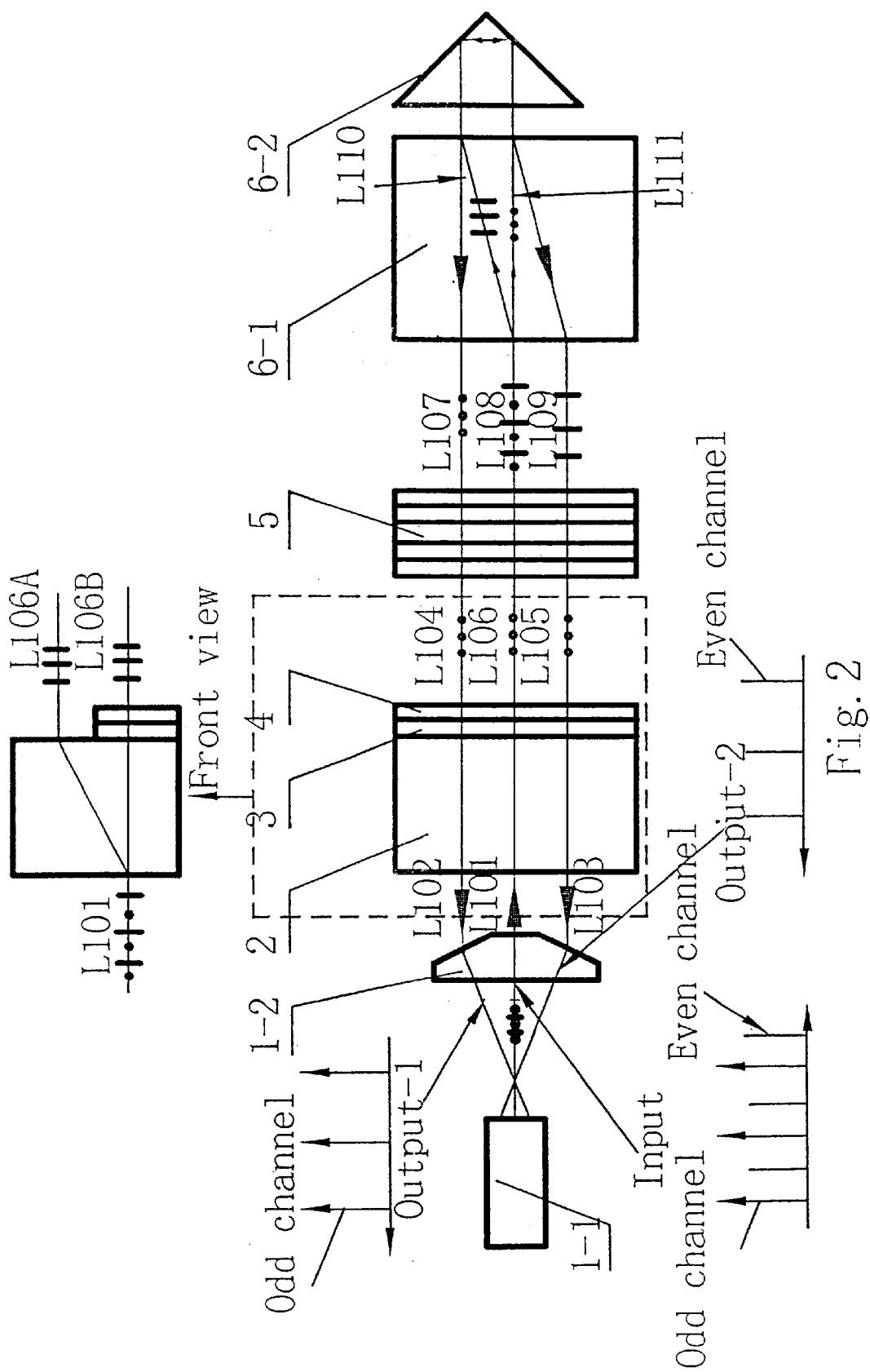
FIG. 2 is a vertical view of light path of the embodiment in FIG. 1.
Figure 3:
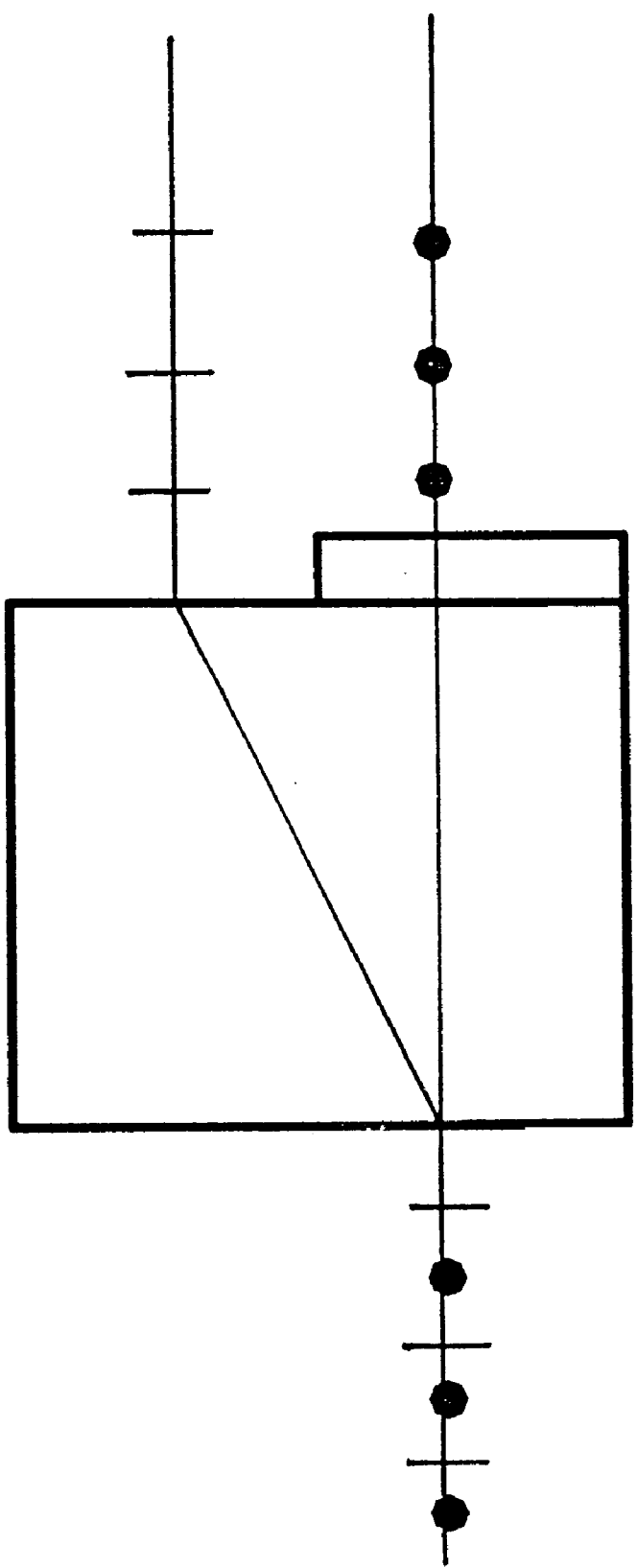
FIG. 3 shows a side view of light path of PMD compensator.
Figure 5:
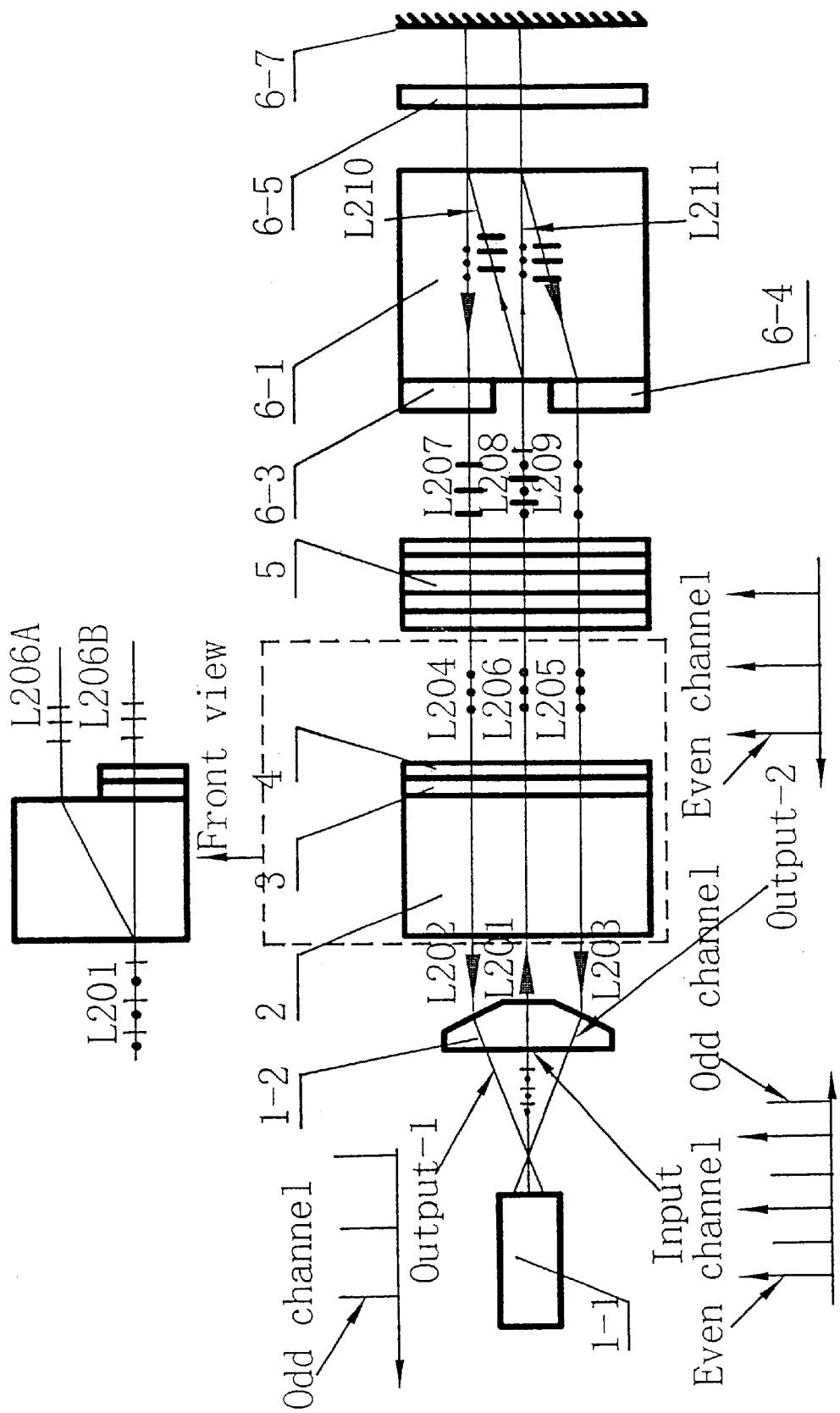
FIG. 5 is a vertical view of light path of the embodiment in FIG. 4.
Figure 6:
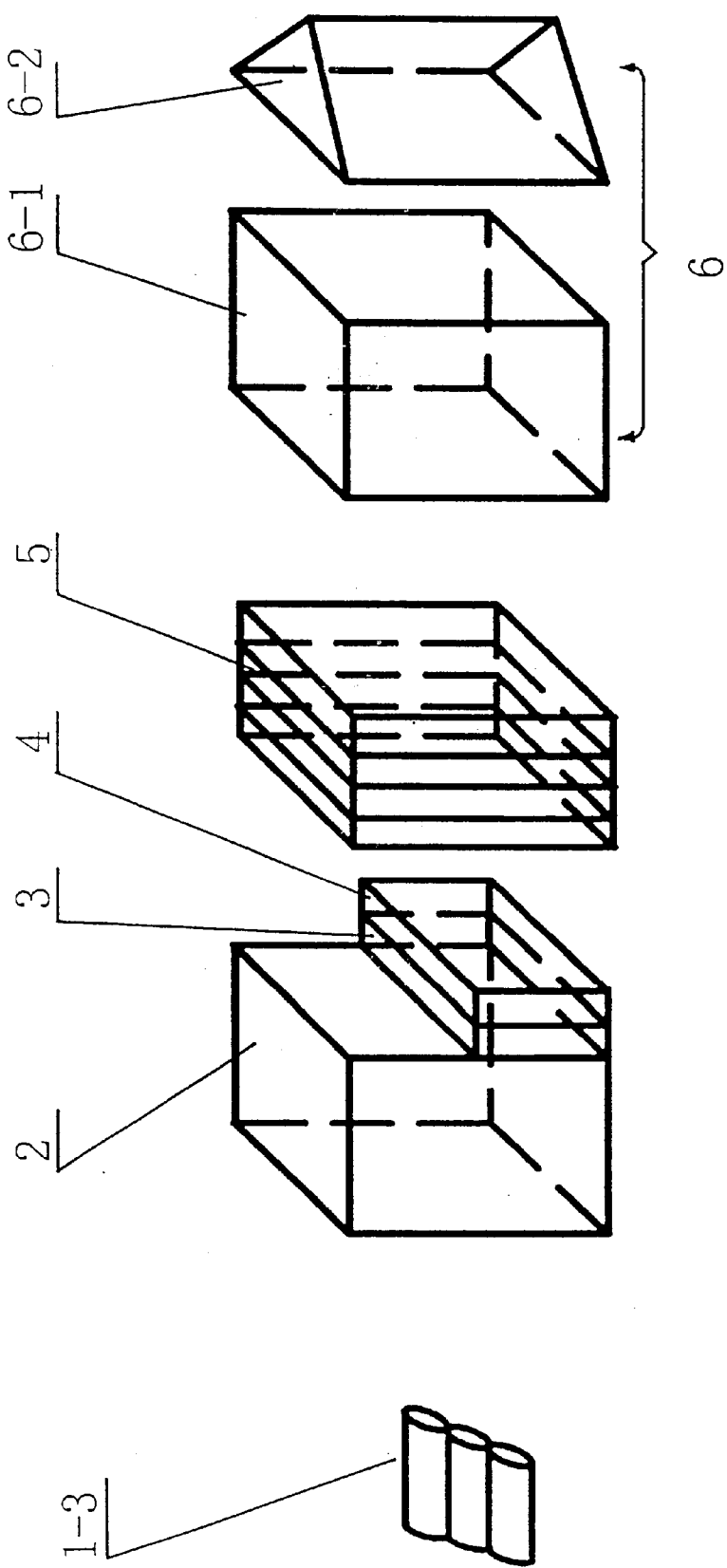
FIG. 6 and FIG. 7 are two embodiments with collimator array of the invention.
Figure 7:
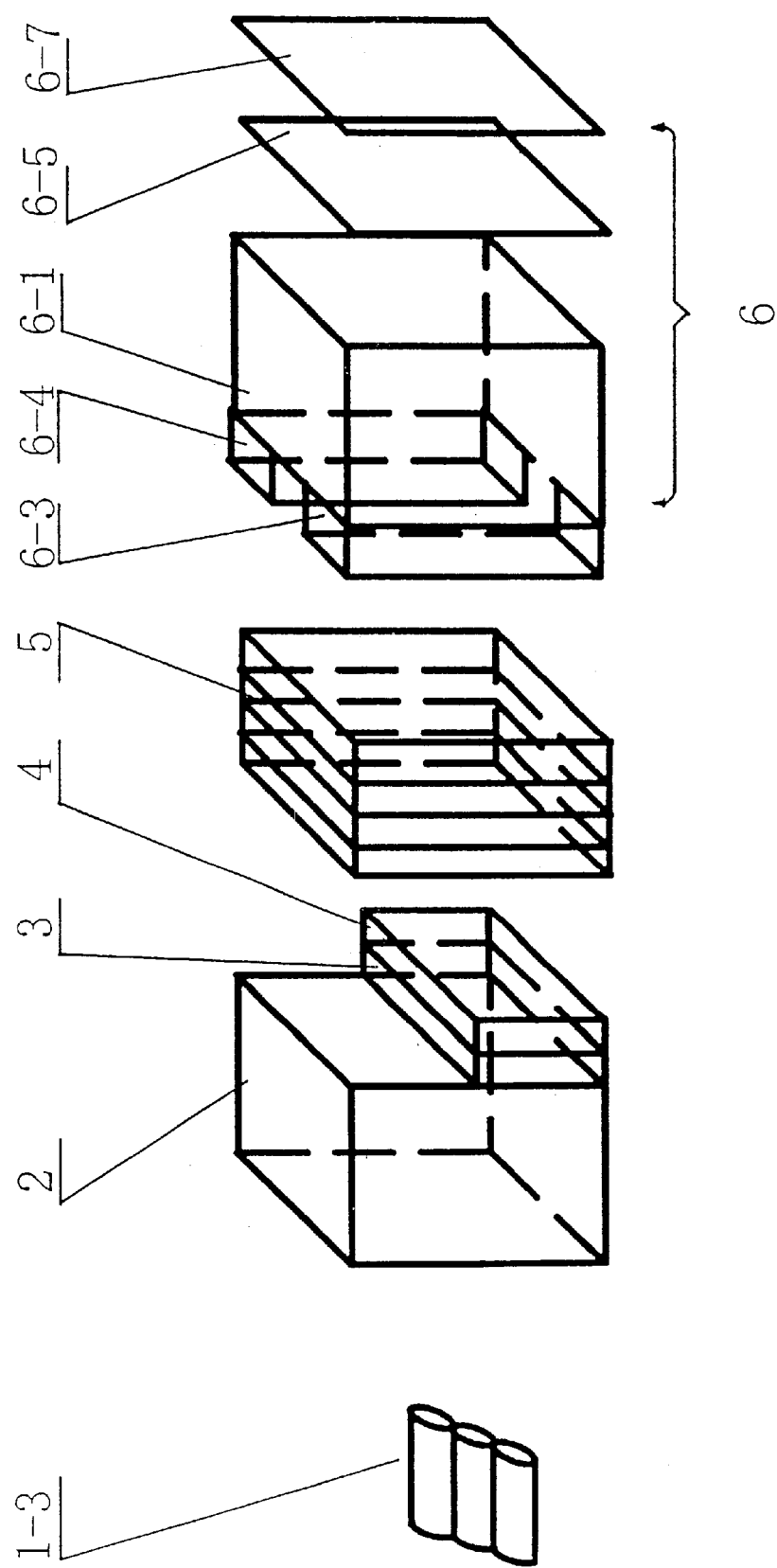
Figure 8:
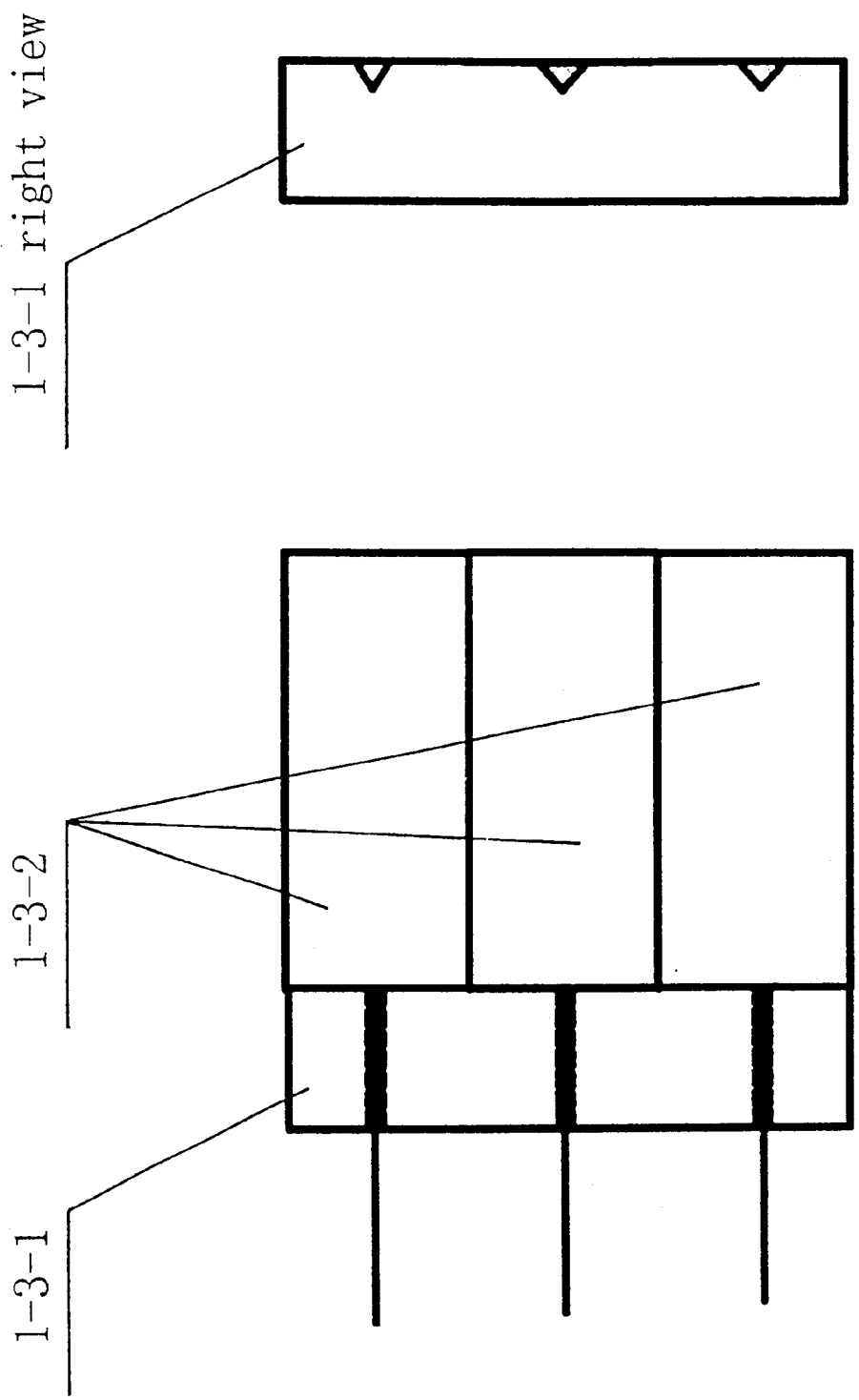
FIG. 8 is a construction of the collimator array in FIG. 6 and FIG. 7.

In FIG. 2, an input light includes wavelength channels 1 and wavelength channels 2. The wavelength channels 1 refer to a sequence of wavelengths which has its phase changed to $[2K\pi]$ when getting out of the birefringent crystal filtering element group 5; the wavelength channels 2 refer to a sequence of wavelength which has its phase changed to $[(2K+1)\pi]$ when getting out of the birefringent crystal filtering element group 5. Light beam L101 passes through polarization splitter 2, and then divided into light beam L106A and light beam L106A, wherein the polarization direction of light beam L106B passing through a glass plate 3 and a $\lambda/2$ phase delay wave plate 4 is same as that of light beam L106A; at the same time, the light path difference of L106B and L106A are compensated, that is to say, the PMD caused by polarization splitter is compensated, a principle of the compensation will be explained latter in detail. Since the characterizations of L106A and L106B are identical with each other in the latter half of the path, only one of them will be described hereafter. After light beam L106 passes through birefringent filtering element group 5, the wavelength channels 1 and 2 have different polarization direction due to their different phase changes. In light beam L108, the polarization direction of wavelength channels 1 is perpendicular to the paper, while the polarization direction of wavelength channels 2 is parallel to the paper. After light beam L108 passes through polarization splitter 6, the wavelength channels 1 and 2 are divided into light beams L111 and L110; the two light beams exchange their positions after passing through prism 6-2. Since their different polarization states with the effect of polarization splitter 6-1, light beam L110 turns back as light beam L109, light beam L111 normally passing through polarization splitter 6-1 turns back as light beam L107. Light beams L107 and L109 pass through the birefringent filtering element group 5 again to obtain a two-stage filtering effect. At the same time, the light beam L107 of wavelength channels 1 remains unchanged polarization as light beam L104, the light beam L109 of wavelength channels 2 changes to light beam L105 with polarization perpendicular to the paper; as a result, light beams L104, L105 and L106 have a same polarization direction, and a same polarization plane; light beams L104 and L105 will be two light beams L102 and L103 that are parallel to light beam L101 and in a same plane with each other after they pass through devices 4, 3 and 2. Then they will be coupled to three single-core collimator array, or pass through a trapezoid prism 1-2 and be coupled into a three-core collimator 1-1; when manufacturing, we may put device 1-2 between device 4 and device 5 to spare space. In FIG. 5, the descriptions with respect to light beams L201, L206A, L206B, L206 and L208 are same with those with respect to light beams L101, L106A, L106B, L106 and L108 in FIG. 2. Light beam L210 is wavelength channels 2, light beam L211 is wavelength channels 1, their phases change λ/2 after passing through λ/4 phase delay element 6-5, flat mirror 6-2, their polarization direction change 90° relative to the original polarization direction, but the polarization direction will be same with the original polarization direction after they pass through λ/2 phase delay elements 6-3 and 6-4 respectively; light beam L207 is wavelength channels 2, and light beam L209 is wavelength channels 1. The polarization direction of light beam L207 will be perpendicular to the paper after passing through birefringent filtering element group 5, while the polarization direction of light beam L209 will have no change. Therefore, light beams L204, L205 and L206 will have a same polarization direction and be in a same polarization plane, from here on, their light path is same as that in FIG. 2, light beams L204 and L205 will be two light beams L202 and L203 that are parallel to light beam L201 and in a same plane with each other after they pass through devices 4, 3 and 2. FIG. 3 is a side view of light path of the two embodiments when light beam pass through compensator 3. It shows the light path when light has passed through a polarization splitter and a PMD compensator, and also shows a PMD compensation effect. FIG. 8 is a collimation lens array 1-3. There is V-shaped slot used to fix fiber on section 1-3-1, section 1-3-2 is a collimation lens.

Figure 9:
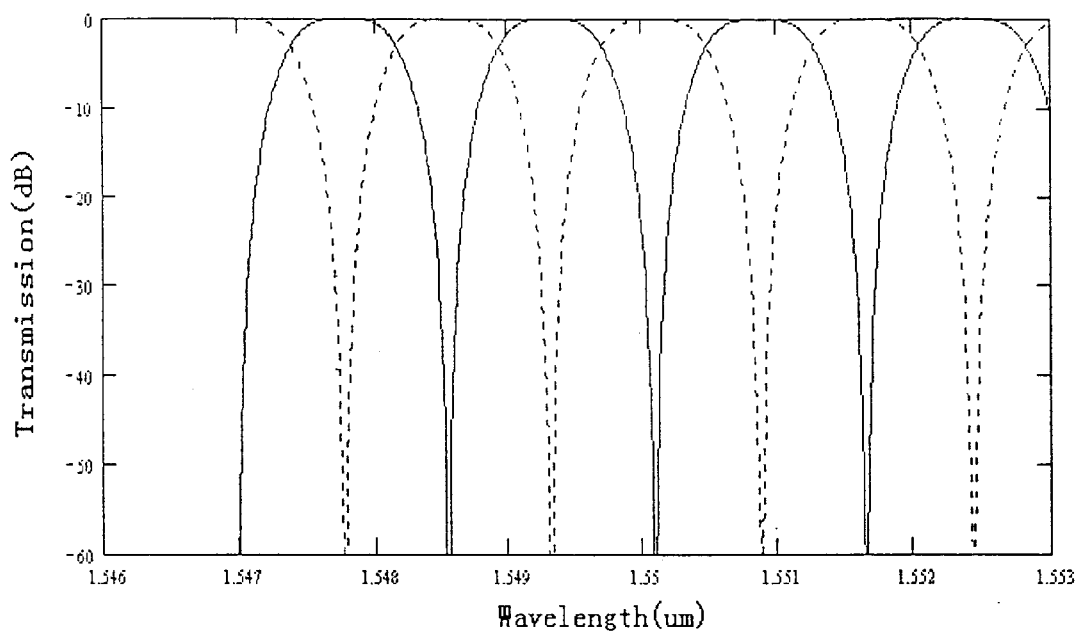
FIG. 9 is a transmission spectrum of the one-stage filter.
Figure 10:
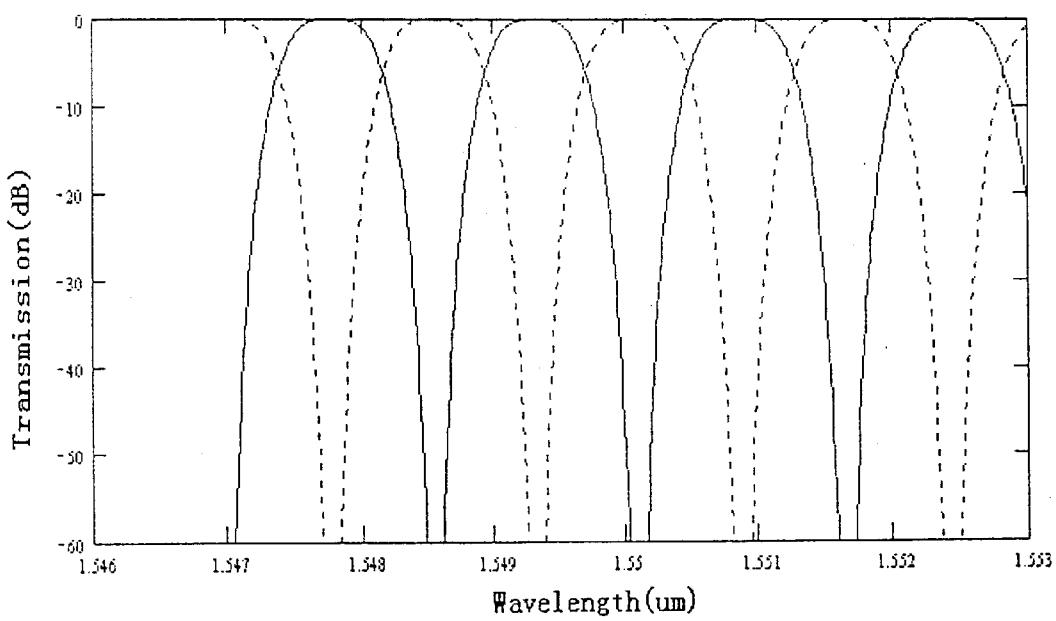
FIG. 10 is a transmission spectrum of the two-stage filter.

FIG. 9 and FIG. 10 are transmission spectra of the one-stage filter and the two-stage filter, using the birefringent crystal filtering element group that has three 7 mm $YVO_4$ crystals lined up. The distance between the two transmission peaks is about 100 GHz. The table below shows a comparison between the two spectra:

|  | −0.5 dB | −1.0 dB | −3.0 dB | −25.0 dB | −30.0 dB |
|---|---|---|---|---|---|
| One-stage Filter | 0.45 | 0.55 | 0.76 | 1.35 | 1.40 |
| Two-stage Filter | 0.37 | 0.45 | 0.62 | 1.15 | 1.21 |

Figure 1:
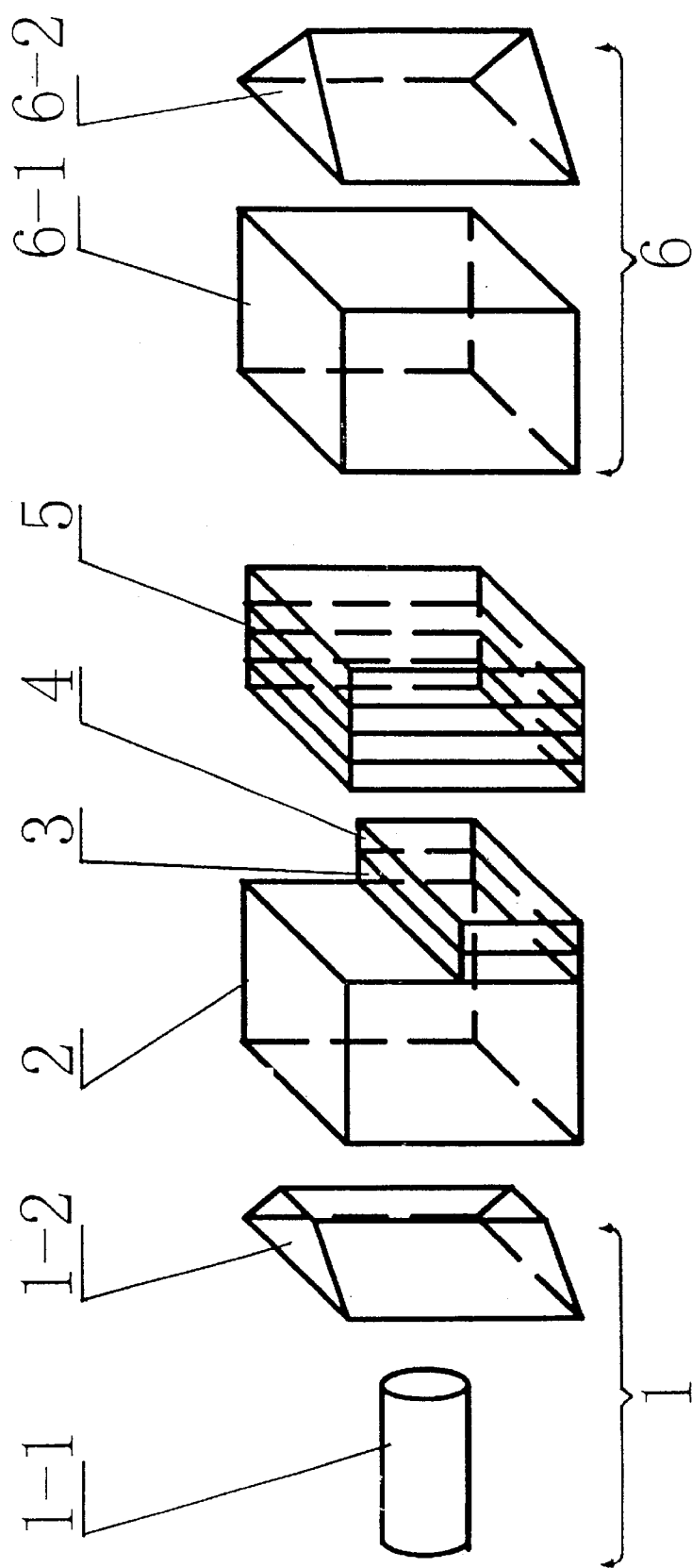
FIG. 1 is a construction of the first embodiment of the invention.
Figure 4:
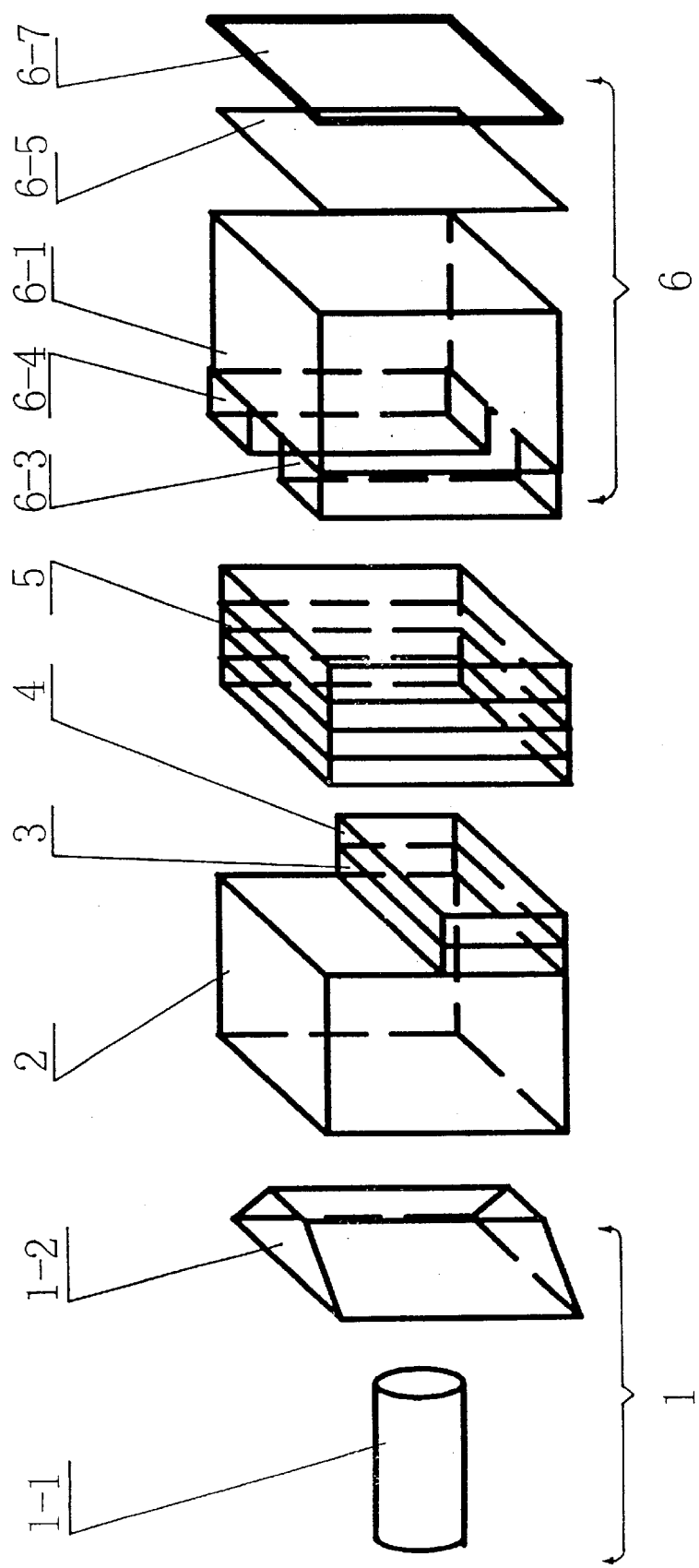
FIG. 4 is a schematic diagram of the construction of the second embodiment of the invention.

The above descriptions and the drawings provide two embodiments with two different wavelength division device of the invention. One embodiment adopts a corner cube prism as a reflection body; the other uses a flat mirror as a reflection body. FIG. 1 relates to a reflective parallel light polarization splitter with a corner cube prism. The light beams are of opposite direction before and after reflection, but still on a same plane. The spacing distance of two light beams after reflection is determined by birefringent crystal and dependent on the optical axis direction, length, and birefringent index of the crystal. The crystal, for example, may be $YVO_4$, $TiO_2$, a-BBO, $CaCO_3$, etc., if 10 mm $YVO_4$ crystal is used, the spacing distance will be 1 mm. FIG. 4 relates to a reflective parallel light polarization splitter with a flat mirror and a λ/4 phase delay element. Because a 45° axis direction and a λ/4 phase delay element are applied, the polarization states of two light beams after separation change 90° angle. In order to have them turn to original state, λ/2 phase delay elements 6-3 and 6-4 with 45° axis direction are added.

The invention adopts a construction that can compensate PMD caused by the polarization splitter. In the polarization splitter, because the path of light O and the path of light E are very different, PMD is caused. We have to compensate the path of the light beam that passes a short path, so as to eliminate PMD. For example, in order to compensate a PMD caused by a 7 mm $YVO_4$ polarization splitter with 45° axis direction, we first calculate the path difference of O light and E light to be about 0.67 mm, If using K9 glass element to make compensation, the element must be 1.24 mm in thickness.

In such a reflective wavelength division device, if we modify the birefringent filtering element group by electro-optic modulation, magneto-optic modulation or other modulation device, we may obtain a reflective optical switcher. We only need replace the filter element group with a phase-delay-controllable birefringent crystal, e.g. liquid crystal, to obtain an optical switcher.

What is claimed is:

1. A comb wavelength division multiplexer having an input side including an input device, said multiplexer comprising:

a first polarization splitter (2) optically coupled to the input device;

a first λ/2 phase delay means (4) optically coupled to said polarization splitter;

a birefringent crystal filter (5) optically coupled to said λ/2 phase delay means and said first polarization splitter; and a reflective polarization splitter device (6) including a second polarization splitter (6-1), said reflective polarization splitter device being optically coupled to said birefringent crystal filter for splitting an incident light beam from the birefringent crystal filter into respective polarized beams, and reflecting said respective polarized beams back through said birefringent crystal filter and said first polarization splitter to an output device on the input side, wherein a three-core collimator and trapezoid prism provides the input device and said output device.

\* \* \* \* \*